United States Patent [19]

Primeaux, II

[11] Patent Number: 5,153,232
[45] Date of Patent: Oct. 6, 1992

[54] FOAMED POLYUREA ELASTOMER-RIGID AND CLOSE-CELLED

[75] Inventor: Dudley J. Primeaux, II, Elgin, Tex.

[73] Assignee: Texaco Inc., White Plains, N.Y.

[21] Appl. No.: 652,954

[22] Filed: Feb. 8, 1991

[51] Int. Cl.$^5$ .............................................. C08G 18/32
[52] U.S. Cl. .................................... 521/110; 521/111; 521/112; 521/115; 521/128; 521/159; 521/163
[58] Field of Search ............... 521/115, 128, 110, 111, 521/112, 159, 163

[56] References Cited

U.S. PATENT DOCUMENTS 4,696,954  9/1987  Pritchard et al. .................. 521/163

*Primary Examiner*—Maurice J. Welsh
*Assistant Examiner*—Rachel Johnson
*Attorney, Agent, or Firm*—Robert A. Kulason; James J. O'Loughlin; Dominick G. Vicari

[57] ABSTRACT

A polyurea elastomer foam is disclosed. Specifically, the polyurea foam of this invention includes an (A) component including an isocyanate and a (B) component including (1) a primary amine terminated polyoxyalkylene polyol, (2) a chain extender, (3) water employed as the sole blowing agent and (4) a surfactant employed as a foam stabilizer. The polyurea foam of this invention is characterized as a rigid, closed cell foam.

20 Claims, No Drawings

FOAMED POLYUREA ELASTOMER-RIGID AND CLOSE-CELLED

BACKGROUND OF THE INVENTION

1. Field of the Invention

The present invention relates generally to foamed polyurea elastomers and, more particularly, to rigid, closed cell polyurea elastomer foams prepared from, among other things, primary aliphatic amines. 2. Description of Background Art In general, polyurea foams have been used in molded foam applications, such as in the manufacture of automobile interiors (seating, etc.), as well as in slabstock foams, which are oftentimes used as carpet underlay or in furniture applications. Polyurea foams have also demonstrated utility in a wide variety of other padding or cushioning applications.

The polyurea foams of the present invention are specifically rigid, closed-cell foams which are most typically employed as insulation, simulated wood parts, such as speaker cabinets, picture frames, doors and the like, packaging foams and shock absorbing foams, to name a few.

As is recognized in Priester, R. D. et al., *High Resiliency Polyurea Foam —An Improved Flexible Foam Matrix*, a paper distributed at the 32nd ANNUAL POLYURETHANE TECHNICAL/MARKETING CONFERENCE, Oct. 1—4 (1989), it is quite difficult to prepare polyurea foams using primary aliphatic amines due to their rapid rate of reactivity with isocyanates.

Surprisingly, the rigid, closed cell polyurea foams of the present invention are prepared using, among other things, primary aliphatic amines.

U.S. Pat. No. 4,910,231 describes substantially water blown flexible polyurethane foams which are prepared by reacting methylene diphenyl isocyanates with water and one or more isocyanate-reactive compounds selected from polyols and polyamines. In column 2, lines 62–66, and in other parts of the patent, patentees disclose that halocarbon blowing agents are used in addition to water. Thus, this patent does not describe water as the sole blowing agent.

U.S. Pat. No. 4,904,705 describes polyurea foams made from N-(polyoxyalkyl)-N-(alkyl)amines, by reacting said amines with isocyanates and by subsequently employing a small amount of blowing agent in the reaction mixture. This patent teaches away from using primary amines to prepare polyurea foams, due to their extremely high reactivity.

U.S. Pat. No. 4,797,430 describes amine-modified polyurethane (urea) foams and a process for their production. More specifically, the foams are prepared by reacting a relatively high molecular weight isocyanate-reactive compound with a polyisocyanate and an amine. Blowing agents are used to produce the resulting foam, one of which can include water.

U.S. Pat. No. 4,748,192 describes aliphatic polyurethane sprayable coating compositions and a method for their preparation. Specifically, a caprolactone polyol is reacted with an aliphatic isocyanate in the presence of a metallo catalyst and an amine curing agent. Patentee generally describes that his coating composition can be foamed by employing a blowing agent, such as water.

U.S. Pat. No. 4,732,919 describes a reaction injected molded elastomer made by reacting a high molecular weight polyol or polyoxyalkylene polyamine, a chain extender and a quasi-prepolymer of a polyoxyalkylene polyamine and an aromatic isocyanate. While the patent contains no description of a foam, it does describe blowing agents as an additional ingredient in column 5, line 28.

U.S. Pat. No. 4,705,814 describes a reaction product of a polyoxyalkylene polyamine and an isocyanate, wherein the polyoxyalkylene polyamine is present in less than the stoichiometric amount. As in the case of U.S. Pat. No. 4,732,919, this patent does not describe foams but describes the use of blowing agents as additional ingredients.

U.S. Pat. No. 4,469,657 describes a RIM elastomer which comprises the reaction product of a high molecular weight polyhydric polyether, a low molecular weight active hydrogen containing a compound of at least two functionality and a polyisocyanate in the presence of a single tin catalyst or a mixture of tin catalysts wherein two components are reacted together. All of the tin catalyst is placed with the isocyanate component prior to reaction. This patent does not relate to foams but, like some of those patents discussed above, describes employing blowing agents as other ingredients. Blowing agents are described as low-boiling hydrocarbons, carbon dioxide and nitrogen; water is not mentioned.

European Patent Application No. 0 286 005 describes flexible, open cell polyurea foams prepared by reacting a high equivalent weight amine terminated compound, a blowing agent, a crosslinker and a polyisocyanate. Thus, this publication does not relate to the rigid, closed cell foams of the present invention.

SUMMARY OF THE INVENTION

The polyurea elastomer foam of the present invention comprises an (A) component which includes an isocyanate and a (B) component which includes (1) a primary amine terminated polyoxyalkylene polyol, (2) a chain extender, (3) water employed as the sole blowing agent and (4) a surfactant employed as a foam stabilizer, said polyurea elastomer foam being a rigid foam and having a substantially closed cell structure.

DESCRIPTION OF THE PREFERRED EMBODIMENTS

The isocyanates employed in component (A) are those known to one skilled in the art. Thus, for instance, they can include aliphatic isocyanates of the type described in U.S. Pat. No. 4,748,192. Accordingly, they are typically aliphatic diisocyanates and, more particularly, are the trimerized or the biuretic form of an aliphatic diisocyanate, such as hexamethylene diisocyanate, or the bifunctional monomer of the tetraalkyl xylene diisocyanate, such as the tetramethyl xylene diisocyanate. Cyclohexane diisocyanate is also to be considered a preferred aliphatic isocyanate. Other useful aliphatic polyisocyanates are described in U.S. Pat. No. 4,705,814. They include aliphatic diisocyanates, for example, alkylene diisocyanates with 4 to 12 carbon atoms in the alkylene radical, such as 1,12-dodecane diisocyanate and 1,4-tetramethylene diisocyanate. Also described are cycloaliphatic diisocyanates, such as 1,3 and 1,4-cyclohexane diisocyanate as well as any desired mixture of these isomers, 1-isocyanato-3,3,5-trimethyl-5-isocyanatomethylcyclohexane (isophorone diisocyanate); 4,4'-,2,2'- and 2,4'-dicyclohexylmethane diisocyanate as well as the corresponding isomer mixtures, and the like.

A wide variety of aromatic polyisocyanates may be used to form the foamed polyurea elastomer of the present invention. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-iso-cyanatophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to about 100 weight percent diphenyldiisocyanate isomers, of which about 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979.

By far the most preferred aromatic polyisocyanate is methylene bis(4-phenylisocyanate) or MDI. Pure MDI, quasiprepolymers of MDI, modified pure MDI, etc. are useful. Materials of this type may be used to prepare suitable elastomers. Since pure MDI is a solid and, thus, often inconvenient to use, liquid products based on MDI or methylene bis(4-phenylisocyanate) are used herein. U.S. Pat. No. 3,394,164 describes a liquid MDI product. More generally, uretonimine modified pure MDI is included also. This product is made by heating pure distilled MDI in the presence of a catalyst. The liquid product is a mixture of pure MDI and modified MDI and is represented as follows:

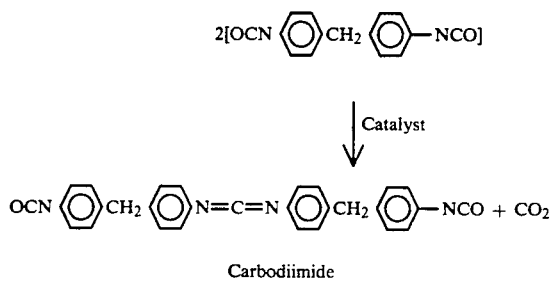

Carbodiimide

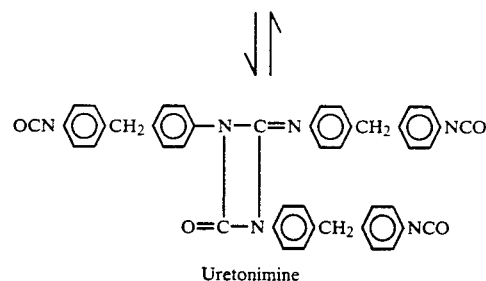

Uretonimine

Examples of commercial materials of this type are Dow's ISONATE® 125M (pure MDI) and ISONATE 143L ("liquid" MDI). Preferably the amount of isocyanates used is the stoichiometric amount based on all the ingredients in the formulation or greater than the stoichiometric amount.

Of course, the term isocyanate also includes quasi-prepolymers of isocyanates or polyisocyanates with active hydrogen containing materials. The active hydrogen containing materials of component (A) can include, but are not limited to, a polyol or polyols, a high molecular weight polyoxyalkyleneamine or combinations thereof.

The polyols include polyether polyols, polyester diols, triols, tetrols, etc., having an equivalent weight of at least about 500, and preferably at least about 1000 up to about 3,000. Those polyether polyols based on trihydric initiators of about 4,000 molecular weight and above are especially preferred. The polyethers may be prepared from ethylene oxide, propylene oxide, butylene oxide or mixtures of propylene oxide, butylene oxide and/or ethylene oxide. Other high molecular weight polyols which may be useful in this invention are polyesters of hydroxyl terminated rubbers, e.g., hydroxyl terminated polybutadiene. Hydroxyl terminated quasiprepolymers of polyols and isocyanates are also useful in this invention.

Especially preferred are amine terminated polyether polyols, including primary and secondary amine terminated polyether polyols of greater than 1,500 average molecular weight having from about 2 to about 6 functionality, preferably from about 2 to about 3, and an amine equivalent weight of from about 750 to about 4,000. Mixtures of amine terminated polyethers may be used. In a preferred embodiment the amine terminated polyethers have an average molecular weight of at least about 2,500. These materials may be made by various methods known in the art.

The amine terminated polyether resins useful in this invention, for example, are polyether resins made from an appropriate initiator to which lower alkylene oxides, such as ethylene oxide, propylene oxide, butylene oxide or mixtures thereof, are added with the resulting hydroxyl terminated polyol then being aminated.

When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, in a preferred embodiment, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by known techniques, for example, as described in U.S. Pat. No. 3,654,370, the contents of which is incorporated herein by reference.

In the practice of this invention, a single high molecular weight amine terminated polyol may be used. Also, mixtures of high molecular weight amine terminated polyols, such as mixtures of di- and trifunctional materials and/or different molecular weight or different chemical composition materials, may be used.

Also, high molecular weight amine terminated polyethers or simply polyether amines may be included in component (A) and may be used alone or in combination with the aforestated polyols. The term high molecular weight is intended to include polyether amines having a molecular weight of at least about 2000. Particularly preferred are the JEFFAMINE ® series of polyether amines available from Texaco Chemical Company; they include JEFFAMINE D-2000, JEFFAMINE D-4000, JEFFAMINE T-3000 and JEFFAMINE T-5000. These polyether amines are described with particularity in Texaco Chemical Company's product brochure entitled THE JEFFAMINE POLYOXYALKYLENEAMINES.

The (B) component of the present foamed polyurea elastomer system includes an amine terminated polyoxyalkylene polyol, a chain extender, a surfactant, water and an amine catalyst used to promote the blowing reaction.

The amine terminated polyoxyalkylene polyol of component (B) is preferably selected from diols or triols and, most preferably, includes a blend of diols and/or triols. The particular polyols, i.e., diols and/or triols, employed in component (B) are the same as those described hereinabove in connection with the quasi-prepolymer of component (A).

The term "isocyanate index", as used herein, refers to the ratio of isocyanate groups (—NCO groups) over reactive hydrogen atoms, which, in the present case, are present in the form of the amine terminated polyoxyalkylene polyol of component (B). The isocyanate index is oftentimes represented in terms of percentage which, of course, would simply mean that the index, as calculated above, is multiplied by 100.

The (A) and (B) components of the present polyurea elastomer foam are reacted at an isocyanate index greater than 1.

The chain extenders useful in this invention include, for example, 1-methyl-3,5-diethyl-2,4-diaminobenzene, 1-methyl-3,5-diethyl-2,6-diaminobenzene (both of these materials are also called diethyltoluene diamine or DETDA and are commercially available as ETHACURE 100 from the Ethyl Corporation, Baton Rouge, La.), 1,3,5-triethyl-2,6-diaminobenzene,3,5,3',5'-tetraethyl-4,4'-diaminodiphenylmethane and the like. Particularly preferred aromatic diamine chain extenders are 1-methyl-3,5-diethyl-2,4-diaminobenzene or a mixture of this compound with 1-methyl-3,5-diethyl-2,6-diaminobenzene. It is within the scope of this invention to include some aliphatic chain extender materials as described in U.S. Pat. Nos. 4,246,363 and 4,269,945.

Other chain extenders include di(methylthio)-toluene diamine or N,N'-bis(t-butyl)ethylenediamine, each of which can be used alone or, preferably, in combination with 1-methyl-3,5-diethyl-2,4-diaminobenzene or 1-methyl-3,5-diethyl-2,6-diaminobenzene. The aforementioned combination includes from about 20 to about 99 parts of di(methylthio)-toluene diamine or N,N'-bis(t-butyl)ethylenediamine to about 80 to about 1 parts of DETDA.

One particularly preferred form of the di(methylthio)toluene diamine component of the chain extender is as Ethacure ® 300, a product of Ethyl Corporation. Specifically, Ethacure 300 is a 4:1 blend of 3,5-di(methylthio)-2,4-toluene diamine and 3,5 di(methylthio)-2,6-toluene diamine, respectively. The N,N'-bis(t-butyl)ethylenediamine component is commercially available from Virginia Chemicals, Portsmouth, Va.

Other chain extenders include amine terminated chain extenders which are generally described as low molecular weight poly-oxyalkylene polyamines containing terminal amine groups. One particular chain extender is represented by the formula:

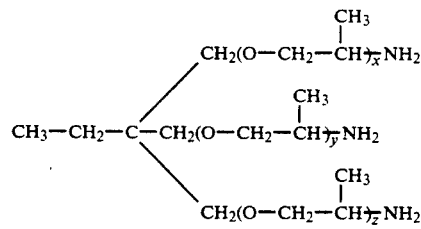

wherein $x+y+z$ has a value of up to about 6.3. The average molecular weight is up to about 500 and the product is commercially available from Texaco Chemical Company as JEFFAMINE T-403.

Another related polyoxypropylene chain extender is represented by the formula:

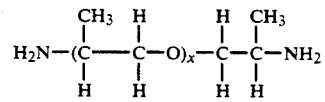

wherein $x$ has a value of up to about 8.3. This product has an average molecular weight of up to about 500 and is commercially available from Texaco Chemical Company as JEFFAMINE D-400. The product having the same formula as above wherein $x$ has an average value of up to about 4.9 is useful. This product has an average molecular weight of up to about 300 and is commercially available from Texaco Chemical Company as JEFFAMINE D-230.

Other chain extenders will be apparent to those skilled in the art and the above recitation is not intended to be a limitation on the invention claimed herein.

The surfactant component of the present foamed polyurea elastomer is employed as a foam stabilizer. As merely illustrative, useful foam stabilizers are those described in U.S. Pat. No. 4,904,705. In particular, they include hydrolyzable polysiloxane-polyoxyalkylene block copolymers, such as those described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. Nos. 3,505,377 and 3,629,308. The latter class of copolymers differs from the above-mentioned polysiloxanepolyoxyalkylene block copolymers in that the polysiloxane moiety is bonded to the polyoxy-alkylene moiety through direct carbon-to silicon bonds, rather than through carbon-to-oxygen-to-silicon bonds. These various polysiloxane-polyoxyalkylene block copolymers preferably contain from 5 to 50 weight percent of polysiloxane polymer, with the remainder being polyoxyalkylene polymer. Yet another useful class of foam stabilizer is composed of the cyanoalkyl-polysiloxanes described in U.S. Pat. No. 3,905,924.

Particularly preferred foam stabilizers are those described in column 10, lines 41–48 of U.S. Pat. No. 4,904,705; specifically, the polysiloxane polyether block copolymers L-5340, L-5421, Y-10,184, Y-10,197, all of which are available from Union Carbide.

Generally, the surfactant is employed in an amount of about 0.5 to about 2.5 weight percent. Preferably, the surfactant is employed in an amount of about 0.5 to about 0.75 weight percent.

As briefly described above, water is used as the sole blowing agent in the foamed polyurea elastomer of this invention. More specifically, water reacts with the isocyanate employed in component (A) to produce an amine and carbon dioxide. The carbon dioxide liberated in the foregoing reaction is what "blows" the foam. Blowing catalysts, such as those described hereinbelow, are employed to promote or enhance the reaction.

The amount of water used in the (B) component, based upon the total weight of the (B) component, typically ranges from about 1 to about 8 weight percent. Preferably, the amount of water ranges from about 1 to about 4 weight percent.

The catalysts used to promote the reaction described above are the ones known to those skilled in the art. Particularly preferred are tertiary amine catalysts. 2,2'-dimorpholinediethyl ether, N,N'-dimethylpiperazine, N-butylmorpholine, N-methyl-morpholine, N-ethylmorpholine, bis(2,2'-dimethylamino) ethyl ether, 2-(2-dimethylaminoethoxyl)ethanol, N,N,N'-trimethyl-N'-hydroxyethyl-bisaminoethyl ether, 4-(2-methoxyethyl) morpholine and blends thereof are representative of preferred catalysts for use herein.

Optionally, the present polyurea elastomer can include an internal mold release agent to facilitate the removal of the cured elastomer from the open or closed mold. While the release agent, if employed, can be incorporated into the (A) or (B) component, it is preferably incorporated in the (B) component. The internal mold release agents useful in the present invention are known to those skilled in the art; they include, but are not limited to, zinc stearate, sodium oleate and silicone agents.

Pigments, for example titanium dioxide, may be incorporated in the elastomer system, preferably in the (B) component, to impart color properties to the elastomer. Similarly, filler materials may also be included in the present polyurea elastomer.

Post curing of the elastomer of the invention is optional but, advantageously, is not necessary. Post curing is typically employed where flexible, open cell foams are produced to improve some elastomeric properties, such as heat sag. In contrast, the rigid, closed cell polyurea foams of the present invention do not require post curing.

The (A) component and (B) component of the present polyurea elastomer system are combined or mixed under high pressure; most preferably, they are impingement mixed directly in the high pressure equipment, which is, for example, a GUSMER® H-V proportioner (or a GUSMER UR-H-2000) fitted with a GUSMER Model GX-7 spray gun where open mold work or coating is desired or, where closed mold work is desired (e.g., RIM or RRIM), the proportioner can be fitted with standard RIM or RRIM equipment. In particular, a first and second pressurized stream of components (A) and (B), respectively, are delivered from two separate chambers of the proportioner and are impacted or impinged upon each other at high velocity to effectuate an intimate mixing of the two components and, thus, the formation of the elastomer system, which is then delivered onto or into the desired substrate via the spray gun or RIM equipment.

The volumetric ratio of the (A) component to the (B) component is generally from about 30 to 70 percent to about 70 to 30 percent.

GLOSSARY OF TERMS AND MATERIALS

TEXOX® PPG-2000 —Polypropylene oxide of about 2000 molecular weight; a product of Texaco Chemical Company.

ISONATE® 143 L —Carbodiimide modified liquid MDI; a product of the Dow Chemical Company.

JEFFAMINE® T-5000 —Polypropylene oxide triamine of about 5000 molecular weight; a product of Texaco Chemical Company.

JEFFAMINE® D-2000 —Polypropylene oxide diamine of about 2000 molecular weight; a product of Texaco Chemical Company.

ETHACURE® 300 —3,5-dimethylthio-2,4-toluenediamine and 3,5-dimethylthio-2,6-toluenediamine; a product of the Ethyl Corporation.

TEXACAT® ZF-20 —Bis-(dimethylaminoethylether); a product of Texaco Chemical Company.

SURFACTANT L-5309 —A silicone surfactant; a product of Union Carbide.

RUBINATE® M —Polymeric methylene diisocyanate; a product of ICI Chemicals.

TEXACAT® ZR-70 —2,-(2-dimethylaminoethoxy-)ethanol; a product of Texaco Chemical Company.

The following examples are provided to further illustrate preferred embodiments of the present invention and should not be construed as limiting the present invention in any way.

In the examples, all spray work was performed with a GUSMER® UR-H-2000 high pressure proportioner fitted with a GUSMER model GX-7 spray gun. The elastomer systems were sprayed using a block temperature of 110° F. to 150° F. on the (A) component and (B) component sides, with a hose temperature of 160° F. The system output ranged between 15–25 lbs/min with a line pressure ranging from 800 to 2000 psig.

In Examples I–III, a handmix procedure was followed to produce the foamed polyurea elastomers. The handmix procedure was employed to establish a basis for the machine preparations followed in Examples IV–IX and, more significantly, to demonstrate that a water blown polyurea foam could be made using primary aliphatic amines.

EXAMPLE I

The (A) component of a foamed polyurea elastomer was prepared by combining 50 parts of ISONATE 143L and 50 parts of TEXOX PPG-2000. The (B) component was prepared by combining 7.8 parts of JEFFAMINE T-5000, 69.8 parts of JEFFAMINE D-2000, 7.8 parts of ETHACURE 300 and 14.6 parts of DETDA. To prepare the foamed system, 1.0 grams of water, 0.2 grams of TEXACAT ZF-20 and 0.05 grams of Surfactant L-5309 were added to 15.0 grams of the (B) component prepared above and was mixed thoroughly by hand with a wooden spatula. While the contents were being mixed, 20 grams of the (A) component were added. The resulting system foamed and exhibited a rise time of less than 5 seconds and a density of 2.5 pounds per cubic foot (pcf); no shrinkage was observed.

EXAMPLE II

The foamed polyurea elastomer of this example was produced using the handmix procedure of Example I. Also, the (A) component was prepared as in Example I. The (B) component was prepared by combining 7.6 parts of JEFFAMINE T-5000, 68.6 parts of JEFFAMINE D-2000, 16.2 parts of ETHACURE 300 and 7.6 parts of DETDA. The same ingredients and quantities thereof used to foam the system of Example I were used herein. The resulting foamed system produced in this example exhibited a rise time of 10 seconds and a density of 2.0 pcf; some slight shrinkage was noted.

EXAMPLE III

The foamed polyurea elastomer of this example was produced using the handmix procedures of Examples I and II. Also, the (A) component was prepared as in Examples I and II. The (B) component was prepared by combining 7.7 parts of JEFFAMINE T-5000, 69.3 parts of JEFFAMINE D-2000, 11.5 parts of ETHACURE 300 and 11.5 parts of DETDA. The same ingredients and quantities thereof used to foam the systems of Examples I and II were used herein. The resulting foamed system produced in this example exhibited a rise time of 7 seconds and a density of 2.3 pcf; no shrinkage was noted.

EXAMPLE IV

The (A) component of the foamed polyurea elastomer prepared in this example consisted of 100 parts of RUBINATE M. The (B) component was prepared by combining 49.92 parts of JEFFAMINE T-5000, 12.48 parts of JEFFAMINE D-2000, 31.20 parts of JEFFAMINE D-230, 4.84 parts water, 1.25 parts Surfactant L-5309 and 0.31 parts TEXACAT ZR-70. The (A) and (B) components were mixed in the high pressure spray equipment at an (A):(B) weight ratio of 1.22, a volumetric ratio of 1:1, with an index of 1.10. The resulting foamed polyurea elastomer was sprayed onto a flat metal substrate coated with a zinc stearate based external mold release agent. The reactivity of the system was so fast that an acceptable spray pattern could not be obtained, which is believed to be ascribed to the presence of the JEFFAMINE D-230.

EXAMPLE V

The (A) component of the foamed polyurea elastomer prepared in this example was the same as that used in Example IV. The (B) component was prepared by combining 52.29 parts of JEFFAMINE T-5000, 13.07 parts of JEFFAMINE D-2000, 26.14 parts of JEFFAMINE T-403, 5.56 parts water, 1.31 parts Surfactant L-5309 and 1 63 parts TEXACAT ZR-70. The (A) and (B) components were mixed in the high pressure spray equipment at an (A):(B) weight ratio of 1.21, a volumetric ratio of 1:1, with an index of 1.10. The resulting foamed polyurea elastomer was sprayed as in Example IV. It was likewise concluded that this system gelled too fast. In this example, it is believed that the JEFFAMINE T-403 produced the rapid rate of reaction.

EXAMPLE VI

The (A) component of the foamed polyurea elastomer prepared in this example was the same as that used in Examples IV and V. The (B) component was prepared by combining 71.17 parts of JEFFAMINE T-5000, 17.79 parts of JEFFAMINE D-2000, 6.90 parts water, 1.78 parts Surfactant L-5309 and 2.36 parts TEXACAT ZR-70. The (A) and (B) components were mixed in the high pressure spray equipment at an (A):(B) weight ratio of 1.20, a volumetric ratio of 1:1, with an index of 1.10. The resulting foamed polyurea elastomer was sprayed as in Examples IV and V. In contrast, however, a good foam resulted with an instant cream time (<1.0 sec.), a 2-3 second rise time and an 8-10 second tack free time. The system was easily sprayable and exhibited an insignificant amount of shrinkage.

The physical properties of the polyurea elastomer foam produced in Example VI are provided below in Table I.

TABLE I

| Core Density (pcf) | | 1.63 | |
|---|---|---|---|
| Closed cells (%) | | 11.95 | |
| Compressive Strength (psi) | | | |
| parallel | | 2.73 | |
| perpendicular | | 3.12 | |
| Dimensional Stability (%) | | 1 week | 4 weeks |
| 158° F. (95% Rel. Humidity) | Δ vol. | 1.15 | 1.81 |
| | Δ wt. | 0.68 | 0.68 |
| | Δ length | 0.66 | 1.00 |
| 200° F. (Dry) | Δ vol. | 0.66 | 1.31 |
| | Δ wt. | 1.26 | 1.36 |
| | Δ length | 0.17 | — |
| 20° F. (Dry) | Δ vol. | 0.66 | — |
| | Δ wt. | 0.59 | — |
| | Δ length | 0.33 | — |

EXAMPLE VII

The (A) component of a foamed polyurea elastomer was prepared by combining 70 parts of ISONATE 143L and 30 parts of TEXOX PPG-2000 to form a quasi-prepolymer. The (B) component was prepared by combining 83.45 parts of JEFFAMINE T-5000, 9.27 parts of JEFFAMINE D-2000, 3.80 parts of water, 2.32 parts of Surfactant L-5309 and 1.16 parts of TEXACAT ZR-70. The (A) and (B) components were mixed in the high pressure spray equipment at an (A):(B) weight ratio of 1.16, a volumetric ratio of 1:1 and an Index of 1.10. The resulting polyurea elastomer was sprayed in the manner set forth in Examples IV-VI. A foam was initially produced but subsequently collapsed.

EXAMPLE VIII

The (A) component of the polyurea elastomer produced in this example was prepared in accordance with Example VII. The (B) component was prepared by combining 75.04 parts of JEFFAMINE T-5000, 18.76 parts of JEFFAMINE D-2000, 3.71 parts of water, 1.40 parts of Surfactant L-5309 and 1.09 parts of TEXACAT ZR-70. The (A) and (B) components were mixed in the high pressure spray equipment at an (A):(B) weight ratio of 1.15, a volumetric ratio of 1:1, with an Index of 1.10. The resulting polyurea elastomer foam was sprayed as in Examples IV-VII. The resulting foam did exhibit some shrinkage with no collapse, however. A tough integral skin was formed. An instant cream time was observed with a rise time of 4-5 seconds and a tack free time of 8 seconds. The core foam density was 5.0 pcf.

EXAMPLE IX

The (A) component of the polyurea elastomer foam produced in this example consisted of 100 parts of RUBINATE M. The (B) component was prepared by combining 62.58 parts of JEFFAMINE T-5000, 17.88 parts of JEFFAMINE D-2000, 8.94 parts of an alphamethyl glucoside-based primary amine, 6.44 parts water, 1.79 parts Surfactant L-5309 and 2.37 parts TEXACAT ZR-70. The (A) and (B) components were mixed in the high pressure spray equipment at an (A):(B) weight ratio of 1.20, a volumetric ratio of 1:1 and an Index of 1.10. The resulting polyurea elastomer was sprayed as in Examples IV-VIII. The polyurea elastomer foam produced in this example exhibited an excellent cell structure and no shrinkage was observed.

The physical properties of the polyurea elastomer foam produced in Example IX are reported below in Table II.

TABLE II

| | |
|---|---|
| Density (pcf) | 3.8 |
| Closed cells (%) | 23.96 |
| Compressive strength (psi) (parallel) | 11.1 |
| Modulus (psi) | 163 |

What is claimed is:

1. A polyurea elastomer foam comprising an (A) component which includes an isocyanate and a (B) component which includes (1) a primary amine terminated polyoxyalkylene polyol, (2) a chain extender, (3) water employed as the sole blowing agent and (4) a surfactant employed as a foam stabilizer, said polyurea elastomer foam being a rigid foam and having a substantially closed cell structure.

2. The elastomer foam of claim 1 wherein said isocyanate of component (A) comprises a quasi-prepolymer of said isocyanate and a material selected from at least one polyol, a high molecular weight polyoxyalkyleneamine or a combination of said materials.

3. The elastomer foam of claim 2 wherein said at least one polyol of said quasi-prepolymer and said amine terminated polyoxyalkylene polyol of component (B) comprise polyether polyols or polyester polyols having an equivalent weight of at least about 500.

4. The elastomer foam of claim 3 wherein said polyester polyols are polyesters of hydroxyl terminated rubbers.

5. The elastomer foam of claim 3 wherein said polyether polyols are selected from the group consisting of polyols based on trihydric initiators having a molecular weight of at least about 4000; amine terminated polyether polyols having an average molecular weight greater than 1500, a functionality of from about 2 to about 6 and an amine equivalent weight of from about 750 to about 4000; and mixtures thereof.

6. The elastomer foam of claim 5 wherein the functionality of said polyether polyols is from about 2 to about 3.

7. The elastomer foam of claim 3 wherein said polyether polyols are derived from amine terminated polyether resins having greater than 50 percent of their active hydrogens in the form of amine hydrogens.

8. The elastomer foam of claim 3 wherein said amine terminated polyoxyalkylene polyol of component (B) is selected from diols, triols or blends thereof.

9. The elastomer foam of claim 1 wherein said chain extender is selected from a compound represented by the formula:

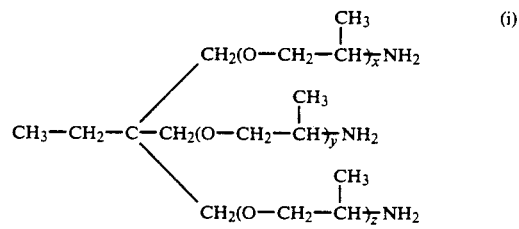

wherein x+y+z has a value of up to about 5.3 and wherein the average amine hydrogen equivalent weight is about 67;

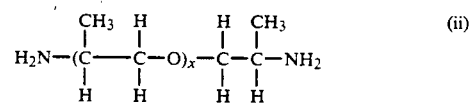

wherein x has a value of about 5.6 and wherein the average amine hydrogen equivalent weight is about 100;

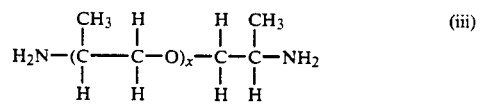

wherein x has a value of about 2.6 and wherein the average amine hydrogen equivalent weight is about 57.5; or (iv) a combination of at least two of compounds (i), (ii) and (III).

10. The elastomer foam of claim 1 wherein said chain extender is selected from the group consisting of 1-methyl-3,5-diethyl-2,4-diaminobenzene; 1-methyl-3,5-diethyl-2,6-diaminobenzene; a mixture of 1-methyl-3,5-diethyl-2,4-diaminobenzene and 1-methyl-3,5-diethyl-2,6-diaminobenzene; 1,3,5-triethyl-2,6-diaminobenzene; and 3,5,3',5'-tetraethyl -4,4'-diaminodiphenylmethane.

11. The elastomer foam of claim 1 wherein said water is employed in an amount of about 1 to about 8 weight percent, based on the total weight of said (B) component.

12. The elastomer foam of claim 1 wherein said water is employed in an amount of about 1 to about 4 weight percent, based on the total weight of said (B) component.

13. The elastomer foam of claim 1 wherein said surfactant is employed in an amount of about 0.5 to about 2.5 weight percent based on the total weight of said (B) component.

14. The elastomer foam of claim 1 wherein said surfactant is employed in an amount of about 0.5 to about 0.75 weight percent based on the total weight of said (B) component.

15. The elastomer foam of claim 1 which further comprises a catalyst to promote the foaming of said polyurea elastomer.

16. The elastomer of claim 15 wherein said catalyst is selected from the group consisting of 2,2'-dimorpholinediethyl ether, N,N'-dimethylpiperazine, N-butylmorpholine, N-methyl-morpholine, N-ethylmorpholine, bis(2,2'-dimethylamino) ethyl ether, 2-(2-dimethylaminoethoxyl)ethanol, N,N,N'-trimethyl-N'-hydroxyethyl-bisaminoethyl ether, 4-(2-methoxyethyl) morpholine and blends thereof.

17. The elastomer foam of claim 1 wherein said (A) and (B) components are reacted at an isocyanate index greater than 1.

18. The elastomer foam of claim 1 wherein the volumetric ratio of the (A) component to the (B) component is from about 30 to about 70 percent of the (A) component to about 70 to about 30 percent of the (B) component.

19. The elastomer foam of claim 1 further comprising an internal mold release agent.

20. A polyurea elastomer foam comprising an (A) component which includes a quasi-prepolymer of an isocyanate and a material selected from at least one polyol, a high molecular weight polyoxyalkyleneamine or a combination of said materials and a (B) component which includes (1) a primary amine terminated polyoxyalkylene polyol, (2) a chain extender, (3) from about 1 to about 8 weight percent water employed as the sole blowing agent based upon the total weight of said (B) component and (4) a surfactant employed as a foam stabilizer, said polyurea elastomer foam being a rigid foam and having a substantially closed cell structure.

* * * * *